Figure 1:
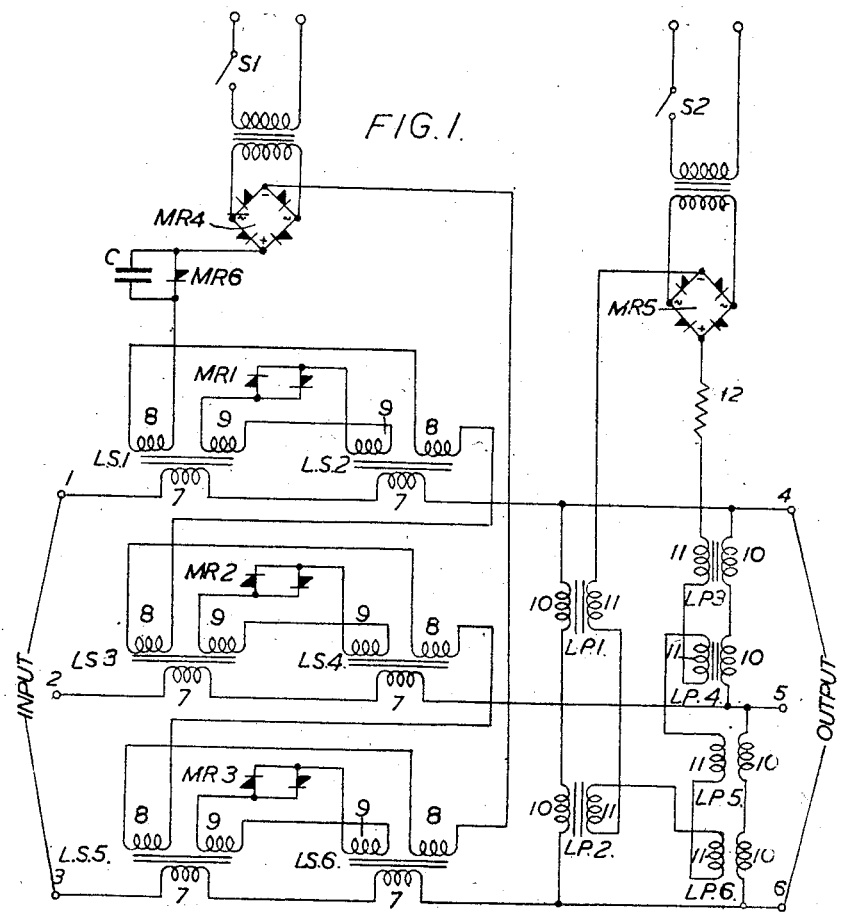

Jan. 28, 1958     T. P. ROBINSON ET AL     2,821,679
ELECTRICAL CONTROL CIRCUITS
Filed Feb. 25, 1954                         2 Sheets-Sheet 1

Inventors
T. P. ROBINSON
B. W. GLOVER
By Philip M. Bolton
Attorney

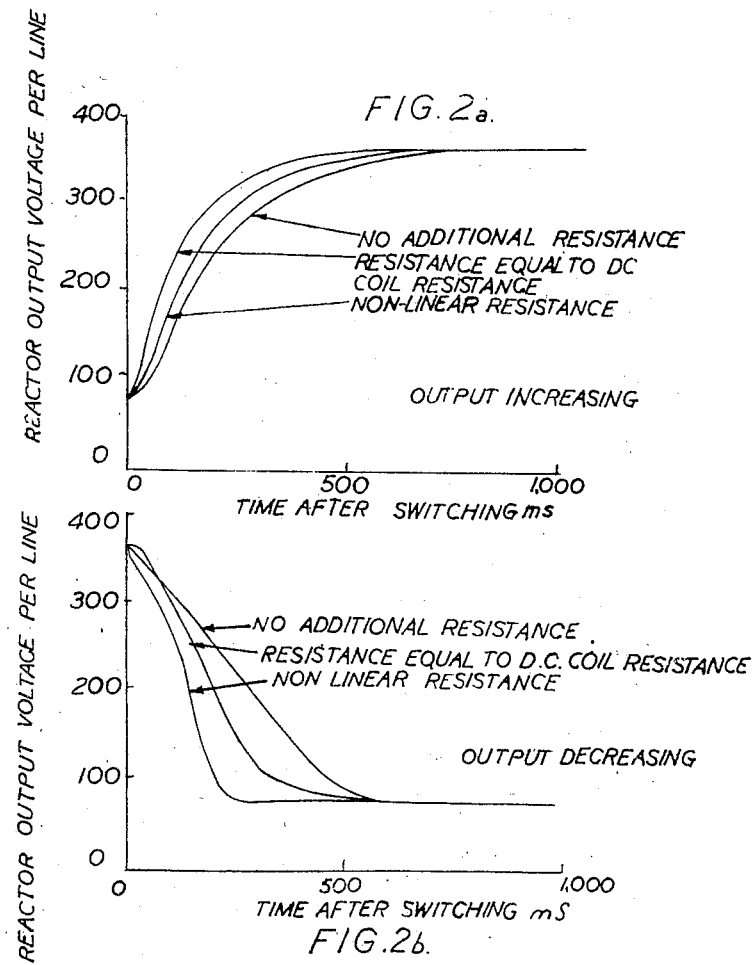

United States Patent Office 2,821,679
Patented Jan. 28, 1958

2,821,679

ELECTRICAL CONTROL CIRCUITS

Thomas Philip Robinson and Bertram Walter Glover, London, England, assignors to International Standard Electric Corporation, New York, N. Y.

Application February 25, 1954, Serial No. 412,593

Claims priority, application Great Britain February 27, 1953

9 Claims. (Cl. 323—89)

This invention relates to electrical control equipment employing saturable reactors.

According to the invention there is provided equipment for controlling the flow of alternating current in single or polyphase power supply circuits which comprises a pair of saturable reactors per live lead, in which the pair, or each pair of said reactors have their main windings connected in series in the corresponding lead, and their control windings connected in opposition to each other, in which further the control windings of the pair or of all the pairs of reactors are connected in series to D. C. supply terminals, and in which the pair or each pair of reactors also comprise a pair of third windings connected in closed circuit in opposition via a resistance variable inversely with current flow in said third windings.

Further according to the invention there is provided equipment for controlling the flow of alternating current in single or polyphase power supply circuits which comprises a pair of saturable reactors per live lead, in which the pair, or each pair of said reactors have their main windings connected in series in the corresponding lead, and their control windings connected in opposition to each other, in which further the control windings of the pair or of all the pairs of reactors are connected in series to D. C. supply terminals, and which comprises a resistance in series with said control windings, said resistance being variable inversely with the amount of control current flowing in said windings from a source connected to said D. C. supply terminals.

In the control of A. C. power to a load circuit, three phase saturable reactor circuits are known consisting of three pairs of series reactors and three pairs of shunt reactors, but the simple circuits suffer from the disadvantages (1) that if the coils of the reactors are connected in series, large harmonic voltages can and do build up on the D. C. coils; and (2) if the coils are connected in parallel to eliminate harmonic voltages, the speed of response of the reactors is substantially reduced. Further, the speed of response of the reactors when they are of large power may be comparatively slow even when connected in series.

The present invention has for its objects the elimination of the even harmonic voltages without causing appreciable slowing of the speed of response and without connecting any of the main windings in parallel, and also the increasing of the speed of response of the reactors without unduly increasing the control power.

The invention will now be described with reference to the accompanying drawing which illustrates, in Fig. 1, a preferred embodiment applied to three-phase power supplies, while Fig. 2 shows graphs of performance.

Fig. 1 shows a 3-phase power supply arrangement provided with input terminals 1, 2 and 3 for connection to the three phases of a 3-phase supply of alternating current (not shown) while 4, 5 and 6 are output terminals for connection to a load requiring a smoothly controlled supply of 3-phase alternating current. Connected in series in each phase between the input and the output terminals are the main windings 7 of three pairs of saturable reactors LS1–LS6, one pair to each phase, as shown, while connected across each pair of phases are the main windings 10 of a further set of six reactors LP1–LP6, one pair of reactors being connected in series across each phase, as shown.

Each of the LS reactors has a D. C. controlling winding 8 and a third winding 9, while each of the LP reactors has only a D. C. controlling winding 11. For each pair of series reactors (LS1 and LS2, for example) and each pair of shunt reactors (LP1 and LP2, for example) the D. C. controlling windings are connected in series opposition, so that voltages induced therein from the A. C. windings mutually cancel, and each set of six controlling windings is connected in a series circuit for connection to a source of direct current whereby each set of 6 reactors may be separately controlled, the units within each set being simultaneously controlled.

So far the arrangements are known. The series (LS) reactors are controllable to provide greater or lesser impedance in the supply circuit to the load, while the shunt (LP) reactors are controllable to provide virtually an open-circuit across the load at full load current to a short-circuit across the load at minimum load current.

With the arrangement described, harmonics are generated in the reactor cores, and transferred to the main and controlling circuits, although direct transfer of fundamental frequency is substantially eliminated by the series-opposition connections in each pair.

With a view to eliminating, or substantially reducing, the incidence of second harmonic, which is the most troublesome, and also most troublesome in the case of the series reactors, the tertiary windings 9 are provided. These must be connected for each pair, in parallel opposition, but since a direct connection (short-circuiting) would materially increase the response time of the reactors, making them sluggish, the connection is made through a suitable non-linear resistance, e. g. two selenium rectifier plates connected in parallel in reverse direction, as shown at MR1, 2 and 3. This has the effect of providing a high resistance connection at low harmonic levels, decreasing to low resistance at high harmonic levels.

The D. C. controlling sources may be any supply of direct current, with separate controls for the two control circuits (LS1–6, LP1–6 respectively). In the present instance, it is preferred to work from the common A. C. source (or one phase of it—although any independent A. C. source would do as well), providing rectifiers MR4 and MR5 for effecting the necessary rectification of the A. C.

In a saturable reactor circuit such as described, when switching of the reactor control circuit is done on the A. C. side, as for instance by contacts S1 and S2, the speed of response is a direct function of the inductances of the control circuits and an inverse function of their respective resistances. The resistance of the control circuits includes, of course, the rectifiers MR4 and MR5.

For the purpose of increasing the speed of response of the reactors, it is common practice to include in the D. C. control circuits a resistor having an ohmic value approximately equal to the resistance of the D. C. coils. An increase in speed is obtained in this way, but the amount of control power is doubled. A further increase in resistance will further decrease response time, but the amount of resistance must be limited in order that control power should not be excessive.

As shown in the present embodiment, either the same response time that would be obtained with a resistance equal in value to the D. C. coils resistance may be obtained with less control power, or a faster response time may be obtained with the same control power.

In order to obtain these desirable results, a suitable non-linear resistance, as for example rectifier stack (MR6), is connected in series in the D. C. control circuit of the series reactors, such that when current flows in the control circuit, the non-linear resistance has a low ohmic value, and as the current reduces in this circuit, as for instance after switching at S1, the ohmic value becomes very large. By this means, the value of the time-constant factor $L/R$ (i. e. ratio of reactance to resistance for the control circuit) can be made effectively very small without undue waste of control power.

The resistor 12 shown in series with MR5 for the shunt reactors is a matching resistor, the rectifier device not being considered necessary for that position.

Typical results showing response time of a set of series reactors, (1) without resistance, (2) with linear resistance equal to the resistance of the D. C. coils, and (3) with non-linear resistance absorbing the same power as does the linear resistance in case 2, are shown in Fig. 2 ($a$) and ($b$). It will be seen from these curves that the speed of decrease of voltage output (Fig. 2 ($b$)) from the reactors is increased, while the speed of increase of reactor output Fig. 2 ($a$) is decreased when non-linear resistance is used instead of linear resistance. These characteristics are particularly desirable for high voltage electrostatic precipitator control purposes.

A further improvement in response time can be effected by connecting a condenser C in parallel with the rectifier MR6. This has the effect of neutralising part of the inductance of the D. C. coils at low values of control current and further reducing the effective value of $L/R$.

It will be understood that the applications of the invention are not limited to the particular circuit arrangement described. The method of harmonic suppression and of increasing the speed of response may be applied to a large number of saturable reactor circuits.

While the principles of the invention have been described above in connection with specific embodiments, and particular modifications thereof, it is to be clearly understood that this description is made only by way of example and not as a limitation on the scope of the invention.

What we claim is:

1. Equipment for controlling the flow of alternating current in power supply circuits which comprises a pair of saturable reactors per live lead, in which each pair of said reactors have their main windings connected in series in the corresponding lead, and their control windings connected in opposition to each other, in which further the control windings of the pairs of reactors are connected in series to D. C. supply terminals, and in which each pair of reactors also comprise a pair of third windings connected in closed circuit in opposition via a resistance variable inversely with current flow in said third windings.

2. Equipment for controlling the flow of alternating current in power supply circuits which comprise a pair of saturable reactors per live lead, in which each pair of said reactors have their main windings connected in series in the corresponding lead, and their control windings connected in opposition to each other, in which further the control windings of the pairs of reactors are connected in series to D. C. supply terminals, and which comprises a resistance in series with said control windings, said resistance being variable inversely with the amount of control current flowing in said windings from a source connected to said D. C. supply terminals.

3. Equipment as claimed in claim 1 for controlling the flow of alternating current in polyphase power supply circuits, and which comprises shunt saturable reactors which have their main windings connected in series in pairs between each pair of live leads, taken in permutation, on the load side of the said series reactors, controlling windings on the said shunt reactors being connected in opposition for each pair, and the pairs of controlling windings connected in series via a controlling load matching resistance to D. C. supply terminals.

4. Equipment as claimed in claim 2 for controlling the flow of current in polyphase power supply circuits, and which comprises shunt saturable reactors which have their main windings connected in series in pairs between each pair of live leads, taken in permutation, on the load side of the said series reactors, controlling windings on the said shunt reactors being connected in opposition for each pair, and the pairs of controlling windings connected in series, via a controlling load matching resistance to D. C. supply terminals.

5. Equipment as claimed in claim 2 and which comprises a capacitor connected in parallel with the said variable resistance.

6. Equipment for controlling the flow of alternating current in three phase power supply circuits which comprises a pair of saturable reactors per phase, in which each pair of said reactors have their main windings connected in series in the corresponding phase, and their control windings connected in opposition to each other, in which further the control windings of all three pairs of reactors are connected in series to A. C. supply terminals via a rectifying means; and which further comprises shunt saturable reactors which have their main windings connected in series in pairs across each pair of phases, taken in turn, on the load side of the said series reactors, and which have the controlling windings of each pair of shunt reactors connected in series opposition, and the controlling windings of all the shunt reactors connected in series to A. C. supply terminals via a rectifying means; means for reducing the incidence of harmonic components of the main frequency in the control windings of the said series reactors which comprises a third winding on each said series reactor connected in closed circuit in opposition to the third winding of the other reactor of the pair, for each pair, via a non-linear resistance, e. g. a selenium rectifier arrangement; and means comprising a non-linear resistance, e. g. a selenium rectifier for reducing the response time of the said series reactors to changes in the controlling current thereof connected in series with the control windings of the said series reactors.

7. Equipment as claimed in claim 6, and which comprises a capacitor connected in parallel with the last-named non-linear resistance.

8. Equipment for controlling the flow of alternating current in power supply circuits which comprises a pair of saturable reactors connected in a live lead, in which said pair of reactors have their main windings connected in series in said lead, and their control windings connected in opposition to each other, in which further the control windings of said pair of reactors are connected in series to the D. C. supply terminals and in which said pair of reactors also comprise a pair of third windings connected in closed circuit in opposition via a resistance variable inversely with current flow in said third windings.

9. Equipment for controlling the flow of alternating current in power supply circuits which comprise a pair of saturable reactors connected in a live lead, in which said pair of reactors have their main windings connected in series in said lead and their control windings connected in opposition to each other, in which further the control windings of said pair of reactors are connected in series to D. C. supply terminals, and which comprises a resistance in series with said control windings, said resistance being variable inversely with the amount of control current flowing in said windings from a source connected to said D. C. supply terminals.

References Cited in the file of this patent

UNITED STATES PATENTS

| | | |
|---|---|---|
| 2,139,232 | Hysko | Dec. 6, 1938 |
| 2,415,189 | Pell | Feb. 4, 1947 |
| 2,477,991 | Lamm | Aug. 2, 1949 |
| 2,547,615 | Bedford | Apr. 3, 1951 |
| 2,615,066 | Milne | Oct. 21, 1952 |

FOREIGN PATENTS

| | | |
|---|---|---|
| 641,603 | Great Britain | Aug. 16, 1950 |